United States Patent [19]

Barnett

[11] Patent Number: 4,458,454
[45] Date of Patent: Jul. 10, 1984

[54] METHODS OF SHAPING CONTACT LENS

[76] Inventor: Howard J. Barnett, 6508 Los Altos, El Paso, Tex. 79912

[21] Appl. No.: 299,949

[22] Filed: Sep. 8, 1981

[51] Int. Cl.³ .......................................... B24B 13/00
[52] U.S. Cl. ............................. 51/284 R; 51/124 L; 51/323; 51/328; 51/216 LP
[58] Field of Search ............. 51/124 L, 105 LG, 129, 51/154, 216 LP, 217 L, 284 R, 284 E, 323, 324, 328, 372, 373, 382, 383, DIG. 34; 350/417; 351/160 H

[56] References Cited

U.S. PATENT DOCUMENTS

| | | | |
|---|---|---|---|
| 490,419 | 1/1893 | Webster | 51/373 X |
| 1,166,639 | 1/1916 | Hill | 51/284 X |
| 2,328,533 | 8/1943 | Walker | 51/284 X |
| 3,050,909 | 8/1962 | Rawstron | 51/284 X |
| 3,112,581 | 12/1963 | Hoffman . | |
| 3,258,879 | 7/1966 | Edelstein . | |
| 3,420,006 | 1/1969 | Barnett | 51/284 R |
| 3,430,391 | 3/1969 | Borish . | |
| 3,458,959 | 8/1969 | Urbach . | |
| 3,471,976 | 10/1969 | Barnett | 51/284 R |
| 3,514,908 | 6/1970 | Herbert et al. | 51/284 |
| 3,750,272 | 8/1973 | Gomond | 51/284 E X |
| 3,874,124 | 4/1975 | Morgan et al. | 51/284 X |

Primary Examiner—Robert P. Olszewski
Attorney, Agent, or Firm—Cushman, Darby & Cushman

[57] ABSTRACT

Various forms of contact lenses can be produced having improved properties. The surface of the lens to be polished is brought into contact with a polishing compound associated with a flexible (but non-resilient) sheet, causing the sheet to flex. Fluid pressure is applied to the sheet counteracting the flexing as a result of lens contact, so that polishing compound associated with the sheet makes contact with the lens surface with uniform force distribution. Relative rotation between the lens and sheet is effected so that all portions of the lens surface in contact with the polishing compound are polished to the same extent. The lens may then be ground to provide a multifocal lens. A multifocal hydrophilic or silicone contact lens having desired distance and intermediate powers may be constructed by acting on the lens so that it is capable of accepting grinding activity, and then effecting distortion-free grinding thereof. Usually a single vision hydrophilic or silicone lens is fitted in a wearer's eye, and then is removed and ground to provide a multifocal contact lens suitable for use by the wearer.

10 Claims, 7 Drawing Figures

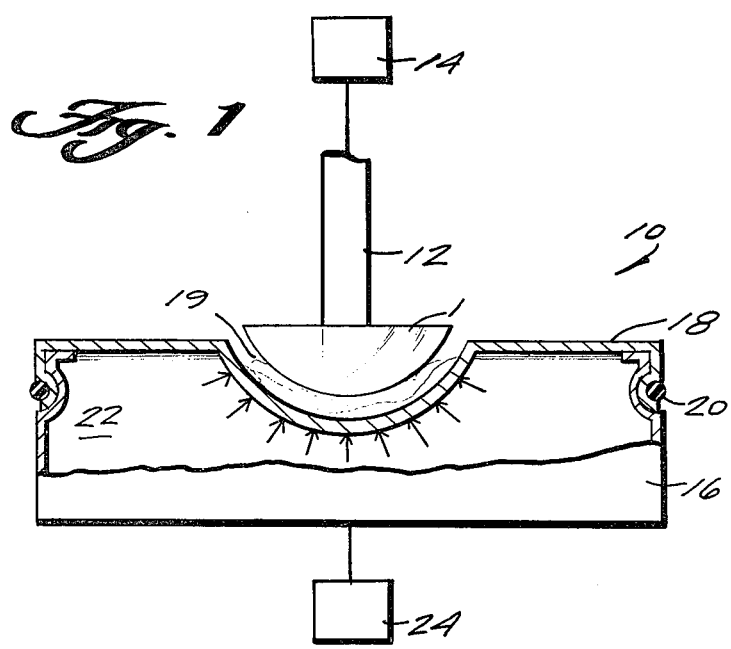
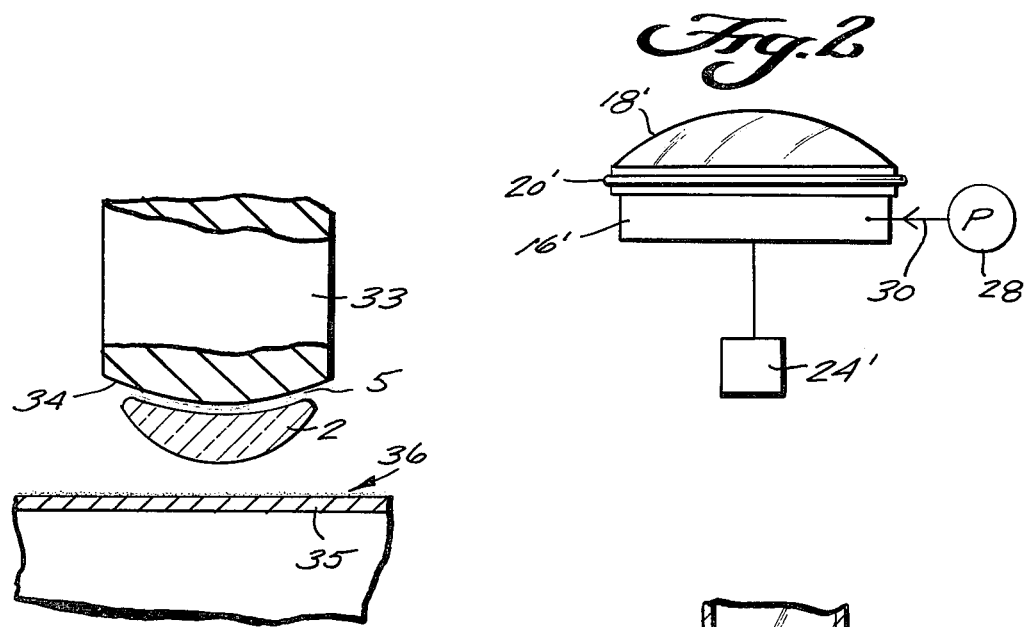
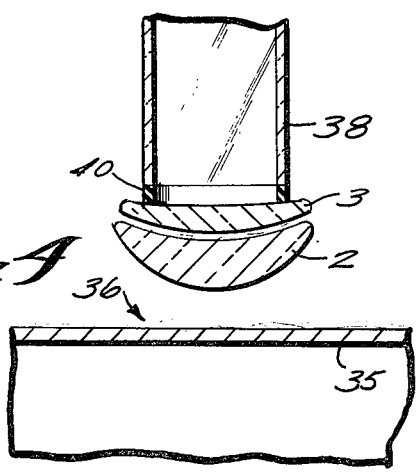

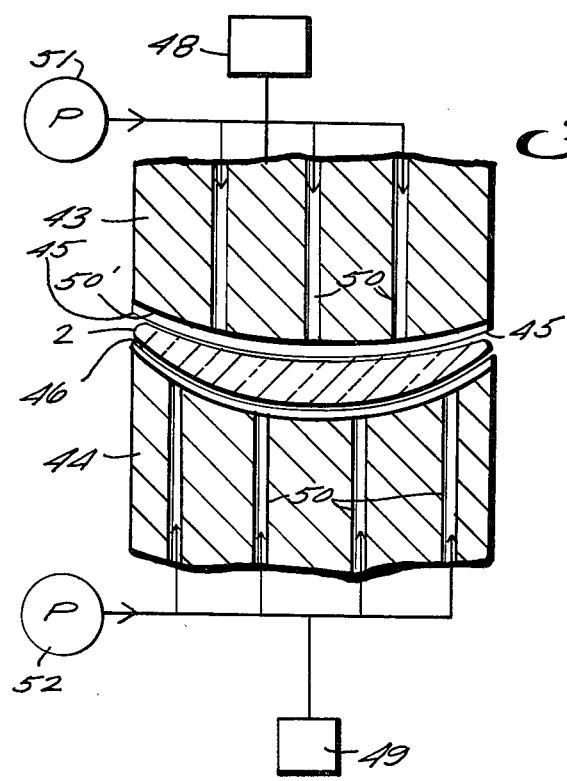
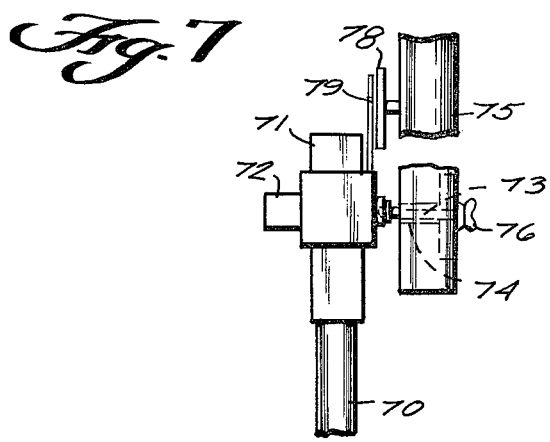

METHODS OF SHAPING CONTACT LENS

BACKGROUND AND SUMMARY OF THE INVENTION

As the utilization of lenses or the like, particularly contact lenses, becomes more widespread, and as the production of lenses, particularly contact lenses, becomes more sophisticated, it is desirable to minimize fabrication difficulties and complexities in order to produce lenses economically. This is particularly true with respect to the production of all of hydrophilic (soft), silicone, and hydrophobic (hard) contact lenses.

The present invention relates to procedures and apparatus facilitating production of lenses. While the invention is particularly applicable to the manufacture of contact lenses, the word "lens" per se as used in the present specification and claims is not restricted to contact lenses, but also includes other types of lenses, mirrors, and the like. The invention is particularly useful in association with the production of multifocal contact lenses. While not restricted to multifocal contact lenses, according to one aspect of the invention multifocal contact lenses—and procedures and apparatus for the manufacture thereof—are made more universal, while according to another aspect of the present invention the production of high quality multifocal contact lenses is facilitated.

In the production of multifocal lenses, such as shown in U.S. Pat. No. 3,471,976 (the disclosure of which is hereby incorporated by reference herein) it is important to start with a single vision lens having the same power throughout. In the manufacture of single vision lenses the base curve of the lens is cut first, and then wax holds the lens to a convex-surfaced chuck, and the power curve of the lens is cut while held by the chuck. Then polishing of the lens, particularly the power curve thereof, is practiced, usually while the lens continues to be held by the chuck. Polishing is conventionally practiced by placing a polishing-holding material (such as cotton or chamois) on a flat sponge, with appropriate polish held by the material, and the polish is brought into contact with the lens. The sponge distorts as the lens is pressed into contact with it, and the sponge thereby provides a biasing force maintaining contact between the polish and the lens. A flat sponge is used since the lens may have virtually an infinite number of different power curves, and a flat sponge can accommodate all such curves so that only one polishing tool is required.

While prior procedures do effect polishing of the lens, a significant portion of the central area of the lens may be worn away during polishing, resulting in a non-uniform product. If this occurs, the lens is not appropriate as a single vision lens, and is not appropriate for manufacture into a multifocal lens such as provided in said U.S. Pat. No. 3,471,976.

According to one aspect of the present invention it has been determined that non-uniform polishing of the lens occurs since the flat sponge is depressed to a greater degree at the portion thereof in operative association with the center of the lens than are portions thereof in operative association with the periphery of the lens. Since the compression is greater at portions of the sponge associated with the central area of the lens, the pressure applied by the sponge to the polish in contact with the central area of the lens is also greater. Thus non-uniform wear during polishing can occur.

According to the present invention it is possible to polish a lens (particularly a dehydrated hydrophilic, a silicone, or a hard contact lens) with complete uniformity of wear during polishing. The polished lens is entirely suitable for ultimate production of a multifocal lens. This is accomplished by utilizing a pressure responsive flexible sheet mounting polishing compound thereon, and mounted to flex under the influence of fluid pressure without substantial distortion of the sheet itself, and fluid pressure means for biasing the sheet so that the polishing compound associated with it makes contact with the lens surface brought in contact therewith with a uniform force distribution. The surface of the lens to be polished is brought into contact with the polishing compound associated with the flexible sheet, causing the sheet to flex, and fluid pressure is applied to the sheet counteracting the flexing as a result of lens contact. Relative rotation between the lens and sheet is then effected so that all portions of the lens surface in contact with the polishing compound are polished to the same extent.

The flexible sheet preferably is made of a generally non-resilient material, such as a material having the general resiliency properties of a sheet of polytetrafluoroethylene. The fluid pressure may comprise a housing having an open face covered by the flexible sheet and defining a substantially fluid-tight volume, with fluid filling the volume and applying a force to the sheet. The fluid may be a generally incompressible liquid, such as oil. (The terms "non-resilient" and "incompressible" are of course relative terms, and are to be interpreted in the present specification and claims to be consistent with the achievement of the ultimate results desired in the practice of the invention.)

According to another aspect of the present invention, it is possible to effectively produce a multifocal hydrophilic or silicone contact lens in a manner consistent with conventional procedures for properly fitting a wearer with contact lenses. Often it is advantageous and less expensive for a practitioner to fit a multifocal lens patient with a single vision contact lens first to be sure that the lens is comfortable, positions properly in the patient's eye, and has the correct power.

Utilization of the single vision contact lens can also provide a good means of determining the distance and near power required by the patient. Since the production of two identical lenses is difficult, it is advantageous (and less expensive) to use the same hydrophilic or silicone contact lens that has been fitted and is known to possess the appropriate characteristics as the starting lens in the production of a multifocal lens. Heretofore it has not been practical to follow such a procedure with hydrophilic contact lenses, however, since the lens must be hydrated to be fitted into the patient's eye, and once hydrated will become grossly distorted if dehydrated, and therefore cannot be processed properly. Such procedure has also been difficult for silicone lenses since they are difficult to grind without distortion.

The word "silicone" as used in the present specification and claims means silicone or other soft or pliable materials suitable for use as contact lenses.

According to the present invention, a method of forming a hydrophilic or silicone contact lens having desired distance and intermediate powers is provided, overcoming the limitations inherent in the prior art. With respect to hydrophilic lenses, the method is practiced by (a) hydrating the hydrophilic contact lens; and (b) without distorting the lens grinding the lens to that it has the desired distance and intermediate powers. Step (a) is practiced by fitting a single vision hydrophilic lens in a wearer's eye, and step (b) is practiced by acting on the single vision lens to provide a multifocal hydrophilic contact lens suitable for use by the wearer. It is also possible at any time that it is necessary to change the parameters of the multifocal lens to further act upon it so that it is suitable for use by the wearer.

The step (b) in the practice of the method according to this aspect of the invention may be accomplished in a variety of manners. For instance the lens may be frozen after hydration, and ground while in the frozen condition. Alternatively, the lens may be dehydrated while clamped between a pair of clamping members which prevent distortion of the lens, and the lens ground once dehydrated. Another alternative is to provide a chuck having a surface with the same curvature as the base curve of the hydrophilic contact lens, and to bring the lens—while hydrated—into operative contact with the chuck curved surface so that the chuck holds the lens in place, and the lens can then be ground while hydrated and held by the chuck. Yet another alternative is to provide a hard contact lens having a power curve substantially the same as the base curve of the hydrophilic lens, and to bring the hydrophilic lens—while hydrated—into contact with the hard contact lens. The hard contact lens is then held by the grinding apparatus in the manner disclosed in said U.S. Pat. No. 3,471,976, and hydrophilic lens is ground while in contact with and held by the hard lens.

For both hydrophilic and silicone contact lenses a method of forming a multifocal lens is provided according to the present invention by acting on the lens so that it is capable of accepting activity from a grinding apparatus, and then grinding the lens without distortion. It is made capable of accepting grinding activity by properly backing it or freezing it.

It is the primary object of the present invention to facilitate the production of high quality lenses, particularly hydrophobic, silicone, and hydrophilic contact lenses. This and other objects of the invention will become clear from an inspection of the detailed description of the invention, and from the appended claims.

BRIEF DESCRIPTION OF THE DRAWINGS

FIG. 1 is a side schematic view, partly in cross-section and partly in elevation, of an exemplary lens polishing apparatus according to the invention;

FIG. 2 is a side schematic elevational view of a modified form of the apparatus of FIG. 1;

FIG. 3 is a detail side cross-sectional view illustrating the inter-relationship between components during the practice of an exemplary hydrophilic or silicone contact lens forming process according to the invention;

FIG. 4 is a view like FIG. 3 illustrating components utilized in the practice of a modified form of hydrophilic or silicone contact lens formation according to the invention;

FIG. 5 is a schematic side cross-sectional view illustrating exemplary components during the controlled dehydration of a hydrated hydrophilic contact lens in the practice of a method according to the invention;

FIG. 6 is a perspective view of exemplary lens grinding apparatus for producing multifocal lenses; and FIG. 7 is a detail side view, partly in cross-section and partly in elevation, of an exemplary hinge assembly of the apparatus of FIG. 6.

DETAILED DESCRIPTION OF THE DRAWINGS

In FIG. 1 a dehydrated hydrophilic or a hard contact lens 1 is illustrated in association with apparatus—shown generally by reference numeral 10—for polishing a surface thereof. The apparatus 10 is capable of polishing the lens so that all portions thereof (i.e. the central area as compared to the peripheral areas) are worn to the same extent during polishing, making the final lens produced a high quality single vision lens and/or emminently suited for use in the production of a multifocal lens. The apparatus 10 includes a means for mounting the lens 1 so that the surface thereof to be polished is accessible. Such means preferably take the form of a chuck 12 of a lens cutting tool, the chuck 12 being held in contact with the base curve of the lens 1 by wax or the like. The chuck 12 may also be made to be angled. Other alternative apparatus could also be utilized, however, and the structure 14 may be the primary mechanism of a lens cutting tool, a motor for rotating the chuck 12 with attached lens 1, or the like.

The apparatus 10 further comprises a pressure responsive flexible sheet 18 for mounting a polishing compound thereon so that the polishing compound may be brought into contact with the surface of the lens 1 to be polished. Conventionally, a suitable polishing compound is held by a polish-holding material. In the schematic illustration of FIG. 1, a piece of cotton 19 is shown mounted on the top surface of the sheet 18, the cotton 19 comprising polish-holding material, and retaining a polish suitable for polishing the lens 1. A wide variety of other polish-holding materials, such as chamois, may be provided. While the sheet 18 may be made of a resilient material such as neoprene, since resiliency is not a necessary (or even desired) quality of the sheet 18, it may be made of a generally non-resilient material. For instance the sheet 18 may comprise a sheet of polytetrafluoroethylene, or other material having the same general resiliency as polytetrafluoroethylene.

The apparatus 10 further comprises means for mounting the sheet 18 so that is may flex, under the influence of fluid pressure and the force of the lens 1 when brought into contact therewith, without substantial distortion of the sheet 18 itself. Desirably, a housing 16 is provided having an open face which is covered by the sheet 18. The sheet 18 is constructed so that it is loose (not taut) when normally covering the open face of the housing 16, and—for example—may be held in place by an O-ring 20, which may be received by a peripheral groove in housing 16.

The apparatus 10 further comprises fluid pressure means for biasing the sheet 18 so that polishing compound (e.g. within polish-holding material 19) associated therewith makes contact with the lens 1 surface to be polished with a uniform force distribution, as indicated by the small arrows of equal size in FIG. 1. This means that all portions of the surface of the lens 1 in contact with the polishing compound associated with the sheet 18 are worn to the same extent during polishing. The housing 16 preferably defines a substantially fluid-tight interior volume 22, and the fluid pressure means comprises fluid filling the volume 22 and applying a force to the sheet 18. The fluid in volume 22 may be a gas (e.g. air), or a liquid, such as a generally incompressible liquid like water or oil. The housing 16 is operatively associated with a device 24 which may comprise either a means for stationarily positioning the housing 16, or for effecting rotation and for angling of the housing. Relative rotation between the lens 1 and sheet 18 is effected by rotating one of elements 12, 16, or both elements at the same time in like or opposite directions.

The apparatus illustrated in FIG. 2 is a minor modification of that illustrated in FIG. 1, with like reference numerals followed by a """ indicating like components. The FIG. 2 embodiment is particularly adapted for polishing concave lens surfaces, such as the base curve of a hard (or dehydrated soft) contact lens, and to this end the pressure means, sheet 18' mounting means, etcetera are designed so that the sheeet 18' normally presents a convex posture, and polish-holding material is disposed on the surface thereof. The sheet 18' may normally be maintained convex by pressurizing the interior volume of the housing 16' to a greater extent than it is pressurized in the FIG. 1 embodiment, such as by supplying fluid under high pressure from pump 28 through line 30 into the interior of the volume defined by housing 16'. If desired, the housing 16' need not be entirely fluid-tight, and the pump 28 can continuously supply fluid to the housing 16', with any leakage being made up by newly supplied fluid.

In utilizing the apparatus 10 in a method of treating a lens according to the invention, the surface of the lens 1 to be polished is brought into contact with the polishing compounds (in material 19) associated with the sheet 18, causing the sheet 18 to flex as illustrated in FIG. 1. Fluid pressure is applied to the sheet 18, as indicated by the small arrows in FIG. 1, counteracting the flexing of sheet 18 as a result of the force applied by lens 1, the pressure application being practiced so that polishing compound (in material 19) associated with the sheet 18 makes contact with the lens 1 surface with a uniform force distribution. Then one or both of the elements 12, 16 are rotated to effect relative rotation between the lens 1 and sheet 18 so that all portions of the lens 1 surface in contact with the polishing compound are worn to the same extent during polishing. After practice of these steps, the lens may be formed into a multifocal lens, such as taught in U.S. Pat. No. 3,471,976.

According to another aspect of the present invention, a method of forming a hydrophilic contact lens having desired distance and intermediate powers is provided. The method is practiced by (a) hydrating a hydrophilic contact lens 2 (see FIGS. 3 through 5); and (b) without distoring the lens 2, grinding it so that it has the desired distance and intermediate powers, such as by utilizing the apparatus of U.S. Pat. No. 3,471,976. Typically step (a) would be practiced by fitting a single vision hydrophilic lens in a patient's eye, the lens of course necessarily being hydrated in order to be fit properly. When it was determined that the lens had the appropriate characteristics, that same lens would then be utilized in the practice of step (b), step (b) preferably being practiced by acting on the single vision lens to provide a multifocal hydrophilic contact lens suitable for use by the patient. Alternative procedures for grinding the lens without distortion can be understood with reference to FIGS. 3 through 5. Several such procedures are also applicable to silicone lenses (2), such lenses being rendered capable of accepting activity from a grinding apparatus before distortion-free grinding thereof is practiced.

One manner of practicing distortion-free grinding of a hydrophilic or silicone contact lens 2 is to provide a chuck 33 (see FIG. 3) having a surface 34 with the same curvature as the base curve of the lens 2. The chuck 33 may be made of a variety of materials such as brass, plastic, and stainless steel. Since there are only a handful of different conventional base curves for hydrophilic and silicone contact lenses, only a handful of chucks 33 with different convex surfaces 34 need be provided to accommodate all conventional hydrophilic and silicone contact lenses. As illustrated in FIG. 3, the lens 2—while hydrated if a hydrophilic lens—is brought into operative contact with the surface 34, the wet lens 2 [see water film 5] clinging tightly to the chuck 33. If a silicone lens it also will cling if wet. The lens 2 may then be ground to produce a multifocal lens such as by utilizing the apparatus shown in FIGS. 6 and 7, the flexible member 35 of the grinding apparatus of FIG. 6, with polishing compound (36) thereon being illustrated schematically in FIG. 3 in association with the lens 2. Even if dehydration of the lens 2 (if a hydrophilic lens) should occur during processing, because of the interengagement between surface 34 and lens 2—and the action of the flexible member 35 on lens 2—it will not distort.

In FIG. 4, alternative components for facilitating distortion-free grinding of a hydrophilic or silicone contact lens 2 are illustrated. In this embodiment, a hard contact lens 3 is provided having a power curve the same as the base curve of the hydrophilic or silicone lens 2. The base curve of the wet lens 2 when wet is brought into contact with the power curve of the hard lens 3, a clinging action therebetween taking place. The hard lens 3 is then mounted onto a suitable component of the polishing apparatus such as that illustrated in FIG. 6. In FIG. 4, the lenses 2, 3 are shown in association with the hollow sleeve 38 and flexible member 35 of the apparatus of FIG. 6, the hard lens 3 being held to the hollow sleeve 38 by an annular piece of double-faced tape 40.

FIG. 5 schematically illustrates components for acting on a hydrated hydrophilic contact lens 2 to effect distortion-free dehydration thereof. A pair of clamping members 43, 44 are provided, each having a surface generally corresponding to one of the power and base curves of the lens 2. For instance clamping member 43 has a surface 45 generally corresponding to the base curve of the lens 2, and clamping member 44 has a surface 46 generally corresponding to the power curve of the lens 2. A clamping force sufficient to prevent distortion is applied to the members 43, 44 through the force application structures 48, 49, and while a clamping force is being supplied the lens 2 is dried. Drying may be accomplished utilizing drying chemicals, or by heating the elements 43, 44 (and coincidentally the surfaces 45, 46), and/or by circulating drying gas past the lens 2. In FIG. 5 a mechanism facilitating circulation of drying gas around the lens 2 is schematically illustrated. Such mechanism includes a plurality of passageways 50, 50' formed in the members 43, 44, with drying gas provided from sources 51, 52 circulating through the passageways 50, 50'. The gas passing through the passageways 50, 50' will ultimately exit to the ambient air, and effect dehydration of the lens 2. Once the lens 2 is dehydrated in this distortion-free manner, it may be processed utilizing the apparatus of FIG. 6 in the same manner as if it has never been hydrated.

As yet another alternative for facilitating the distortion-free grinding of a hydrophilic or silicone contact lens to produce a multifocal lens, a hydrophilic or silicone lens 2 may be frozen (while hydrated if a hydrophilic lens). When frozen, the lens 2 may be brought in contact with suitable apparatus (e.g. hollow sleeve 38 and flexible member 35) of a grinding apparatus, and ground in substantially the same manner as a hard contact lens. An exemplary form of apparatus for producing multifocal contact lenses is illustrated in FIGS. 6 and 7. The various components thereof will be described briefly herein, attention being directed to U.S. Pat. No. 3,471,976 for a more detailed description thereof.

Basic components of the grinding apparatus, indicated generally by reference numeral 60, of FIG. 6 include the rotatable bowl 62 on which the flexible member 35 (e.g. a chamois skin) is mounted. A spinning bowl support 63 is fastened to a base 64 for the apparatus 60 by a strap 65, and cylinder 66 supports the bowl 62 for rotation about a generally vertical axis. A pulley mounted on member 66 is rotated by a V belt 67 which connects the pulley to a motor 68.

A contact lens (such as lens 1 illustrated in FIG. 6) to be ground is mounted by hollow sleeve 38 and double-sided tape 40 to a shaft 70, which is mounted so as to be freely rotatable within a bore in clamped member 71. Clamping member 72 holds clamped member 71, and pivot pin 73 is rigidly attached to rotatable clamping member 72. Pin 73 passes through a bore 74 in the lower end of vertical shaft 75, and a wing nut 76 is provided on the threaded end of pin 73 to lock the members 71, 72 in any relative angular position to which they have been moved. A semi-circular dial 78, which can be calibrated in degrees, is fixed to shaft 75, while pointer 79 is fixed to clamping member 72. The components also can be designed so that shaft 75 can be moved sideways, and locked in any sideways position to which it has been moved.

Traversing member 81 can be moved to any relative horizontal position with respect to sleeve 82 to position the shaft 75 relative to bowl 62. Shaft 75 can be vertically reciprocated in cylindrical guide sleeve 84 by rotation of wheel 85 connected to sprocket 86 which engages a rack (not shown) formed on shaft 75.

When utilizing the apparatus of FIGS. 6 and 7, normally the lens (e.g. lens 1) is ground to the desired final lens diopter while the clamped member 70 is at a fixed angular attitude with respect to the vertical (i.e. vertical shaft 75). The spinning flexible member 35 with grinding compound 36 thereon contacts the center portion of lens 1 and not only effects appropriate grinding of the lens to the distance and intermediate correction, but the final lens produced need not be polished.

It will thus be seen that according to the present invention an advantageous method and apparatus have been provided for the effective polishing of lenses, and a method has been provided for forming a hydrophilic or silicone contact lens having desired distance and intermediate powers. While the invention has been herein shown and described in what is presently conceived to be a practical and preferred embodiment thereof, it will be apparent to those of ordinary skill in the art that many modifications may be made thereof within the scope of the invention, which scope is to be accorded the broadest interpretation of the appended claims so as to encompass all equivalent structures and procedures.

What is claimed is:

1. A method of forming a multifocal hydratable contact lens having desired distance and intermediate powers, comprising the steps of:
   (a) hydrating a hydratable contact lens; and
   (b) without distorting the lens grinding the lens so that it has the desired distance and intermediate powers, by (b1) dehydrating the lens by clamping the lens between a pair of perforated clamping members which prevent distortion of the lens, and drying the lens while so clamped by drawing air through the perforation of the clamping members; and (b2) grinding the lens once dehydrated.

2. A method of forming a multifocal hydratable contact lens having desired distance and intermediate powers, comprising the steps of:
   (a) hydrating a hydratable contact lens; and
   (b) without distorting the lens grinding the lens so that it has the desired distance and intermediate powers, by: (b1) providing a hard contact lens having a power curve the same as the base curve of the hydrated contact lens, and bringing the base curve of the hydrated contact lens into contact with the power curve of the hard contact lens; and (b2) grinding the hydrated lens while in contact with the hard contact lens by effecting relative rotation between the hydrated lens and a grinding apparatus.

3. A method as recited in claim 2 wherein the hydratable contact lens is a hydrophilic contact lens.

4. A method as recited in claim 1 or 2 wherein step (a) is practiced by fitting a single vision hydrophilic lens in a wearer's eye; and wherein step (b) is practiced by acting on the single vision lens to provide a multifocal hydrophilic contact lens suitable for use by the wearer.

5. A method as recited in claims 1 or 2 wherein step (b2) is accomplished by: stretching a flexible member and supporting it about its periphery; coating the member with a grinding compound; spinning the coated member; mounting the lens on a free spinning assembly; and contacting the mounted lens with the spinning coated member at an angular relationship therewith.

6. A method as recited in claims 1 or 2 wherein step (b2) is accomplished by: stretching a flexible member and supporting it about its periphery; coating the member with a grinding compound; mounting the lens to a spinning assembly and positioning the mounted lens above the coated member; spinning the coated member; and grinding the center portion of the mounted lens to a distance correction by contacting the center portion of the lens with the spinning coated member.

7. A method of forming a multifocal distortable contact lens having desired distance and intermediate powers, comprising the steps of:
   (a) acting on the lens so that it is capable of accepting activity from a grinding apparatus by providing a hard contact lens having a power curve the same as the base curve of the distortable contact lens, and bringing the base curve of the distortable contact lens into contact with the power curve of the hard contact lens; and
   (b) without distorting the lens, grinding the lens so that it has the desired distance and intermediate powers, by grinding the lens while in contact with the hard contact lens by effecting relative rotation between the distortable lens and said grinding apparatus.

8. A method as recited in claim 7 wherein the distortable contact lens is a hydrophilic contact lens.

9. A method as recited in claim 7 wherein the distortable contact lens is a silicone contact lens.

10. A method of treating a distortable contact lens utilizing a polishing apparatus formed of a flexible sheet having a polishing compound associated therewith, the sheet in operative communication with a pressurized fluid, comprising the steps of:

(a) acting on the distortable contact lens so that it is capable of accepting activity from said polishing apparatus by providing a hard contact lens having a power curve the same as the base curve of the distortable contact lens, and bringing the base curve of the distortable contact lens into contact with the power curve of the hard contact lens;

(b) bringing the surface of said distortable contact lens to be polished into contact with said polishing compound associated with the flexible sheet, causing the sheet to flex;

(c) applying fluid pressure to the sheet counteracting the flexing thereof as a result of distortable lens contact, so that polishing compound associated with the sheet makes contact with the distortable lens surface with a uniform force distribution; and (d) polishing the distortable lens, so that all of the portions of the distortable lens surface in contact with the polishing compound are worn to the same extent and the distortable lens has the desired distance and intermediate powers, by effecting relative rotation between the distortable lens and said polishing apparatus while the distortable lens is in contact with the hard lens preventing distortion of the distortable lens.

* * * * *